United States Patent [19]

Sakai et al.

[11] Patent Number: 4,963,307

[45] Date of Patent: Oct. 16, 1990

[54] METHOD FOR PRODUCING A TABLET FOR RESIN-MOLDING SEMICONDUCTOR DEVICES AND RESIN-MOLDING METHOD MAKING USE OF THE TABLET

[75] Inventors: Kunito Sakai, Amagasaki; Sueyosi Tanaka, Fukuoka; Yasutugu Tutumi, Fukuoka; Yutaka Morita, Fukuoka, all of Japan

[73] Assignee: Mitsubishi Denki Kabushiki Kaisha, Japan

[21] Appl. No.: 271,905

[22] Filed: Nov. 16, 1988

Related U.S. Application Data

[62] Division of Ser. No. 107,336, Oct. 9, 1987, Pat. No. 4,826,931.

[51] Int. Cl.⁵ .............................................. B29C 43/56
[52] U.S. Cl. ................................. 264/102; 264/120; 264/272.17; 264/294; 264/320; 264/325
[58] Field of Search ................. 264/102, 120, 272.17, 264/294, 328.4, 325, 320; 425/116, 544

[56] References Cited

U.S. PATENT DOCUMENTS

| | | | |
|---|---|---|---|
| 3,071,814 | 1/1963 | Buggenheim | 264/328.4 |
| 3,608,023 | 9/1971 | Scarborough | 264/102 |
| 4,045,867 | 9/1977 | Strom | 264/102 |
| 4,511,317 | 4/1985 | Bandoh | 264/272.17 |
| 4,569,814 | 2/1986 | Chong et al. | 264/325 |
| 4,741,787 | 5/1988 | Shimizu et al. | 264/272.17 |

FOREIGN PATENT DOCUMENTS

| | | | |
|---|---|---|---|
| 58-138607 | 8/1983 | Japan | 425/544 |
| 59-7009 | 1/1984 | Japan . | |
| 59-11232 | 1/1984 | Japan | 264/102 |
| 59-139633 | 8/1984 | Japan | 264/102 |
| 60-251635 | 12/1985 | Japan | 264/328.4 |
| 61-41134 | 9/1986 | Japan . | |
| 62-113523 | 5/1987 | Japan | 264/102 |
| 62-261404 | 11/1987 | Japan . | |
| 62-261405 | 11/1987 | Japan . | |

Primary Examiner—Jeffery Thurlow
Attorney, Agent, or Firm—Leydig, Voit & Mayer

[57] ABSTRACT

A resin-molding tablet for use in resin-molding semiconductor devices has a tablet body formed of powdered or particulate resin. The particles of the resin are compacted such as to form voids between adjacent particles. At least the outer peripheral region of the tablet is fused such that the resin particles are welded together to form a continuous layer of fine and impervious structure substantially free of open pores. The internal air trapped in the voids of the tablet is drawn and removed before the tablet is fused so that the tablet is substantially free of air. The tablet is produced by placing a particulate or powdered resin material in a vacuum vessel so as to allow the internal air in the resin material to be drawn outside, and then applying pressure and heat to the resin material so that at least the peripheral region of the mass of the particulate resin is fused to weld together. The tablet thus formed is melted and forcibly fed into a vacuum die cavity in which a semiconductor device to be molded is accommodated, thereby to hermetically seal the semiconductor device. Thus, a semiconductor package having substantially no voids is produced.

6 Claims, 6 Drawing Sheets

METHOD FOR PRODUCING A TABLET FOR RESIN-MOLDING SEMICONDUCTOR DEVICES AND RESIN-MOLDING METHOD MAKING USE OF THE TABLET

This application is a division of application Ser. No. 07/107,336 filed Oct. 9, 1987, now U.S. Pat. No. 4,826,931 issued May 2, 1989.

BACKGROUND OF THE INVENTION

1. Field of the Invention

The present invention relates to a tablet made of a resinous material such as a plastic for resin-molding semiconductor devices such as semiconductor integrated circuits (referred to as "IC" hereinafter), as well as to a method of producing such a tablet. The invention also is concerned with an improved resin-molding method for resin-molding semiconductor devices by making use of the tablet.

2. Description of the Related Arts

Figure 11:
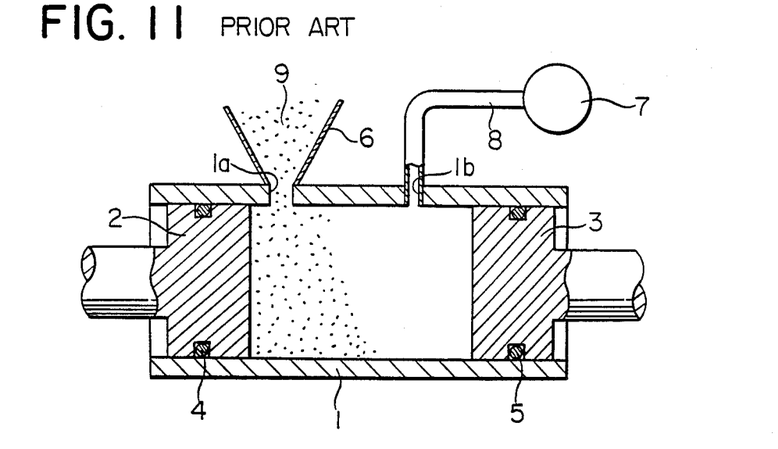
FIGS. 11 and 12 are illustrations of different steps of a conventional method for producing a resin-molding tablet.

FIG. 11 shows in section one example of a conventional tablet forming machine of the type disclosed in Japanese Patent Application Laid-Open No. 59-139633. The tablet forming machine shown in FIG. 11 has a cylinder 1, a compression piston 2 slidingly received in the bore of the cylinder 1 for compressing powdered resin, and a pusher piston 3 which also is slidingly received in the bore of the cylinder 1 in an opposed relation to the compression piston 2 for pushing a tablet, which has been formed under compression by the compression piston 2, to the outside of the cylinder 1. The pistons 2 and 3 are provided with "O" rings 4 and 5 which are fitted on their outer peripheral surfaces for providing seals between the outer peripheral surfaces of these pistons 2, 3 and the inner peripheral surface of the cylinder 1. The tablet forming machine further has a hopper 6 which is connected to a supply port 1a formed in a portion of the wall of the cylinder 1 for charging the powdered resin into the cylinder 1, and a vacuum pump 7 which is connected through a conduit 8 to a discharge port 1b which also is formed in the wall of the cylinder 1 in a spaced apart relation to the supply port 1a in the longitudinal direction of the cylinder 1. The vacuum pump 7 exhausts air from a chamber, which is defined by the pistons 2 and 3 in the cylinder 1, through the discharge port 1b and the conduit 8 to establish a vacuum in the chamber.

In operation, the piston 2 is retracted to the left as viewed in FIG. 11 to a position where it does not block the supply port 1a and a metered amount of a powdered resin 9 is charged into the cylinder 1 from the hopper 6 through the supply port 1a. The powdered resin is, although not exclusively, a mixture of particles or powders of an epoxy resin and an inorganic filler.

Figure 12:
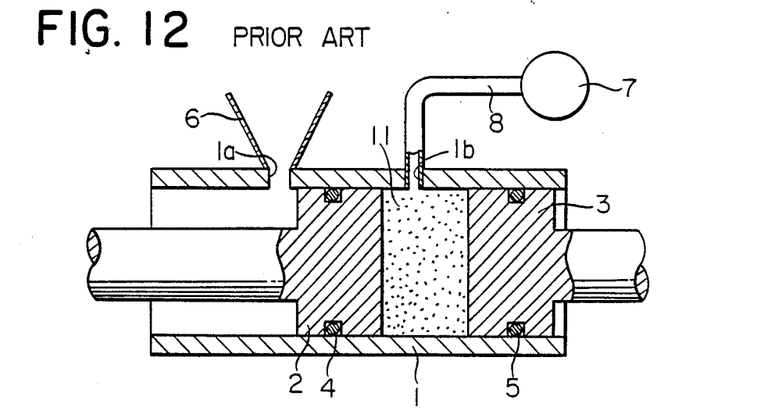

Then, after the piston 2 has been moved to the right as viewed in FIG. 12 to a position intermediate the supply port 1a and the discharge port 1b, the vacuum pump 7 is started to exhaust air from the chamber in the cylinder 1 through the discharge port 1a, thereby to establish a reduced pressure in the cylinder 1.

Subsequently, the piston 2 is further moved to the right to compress the powdered resin at a pressure of, for example, 1,000 kg/cm$^2$. Consequently, any voids or minute spaces between the particles of the powdered resin 9 are collapsed so that the air trapped there is expelled and is discharged to the outside of the cylinder 1 through the discharge port 1b.

It is thus possible to form, by a compression forming method, a tablet in which adjacent particles are densely arranged to closely contact with one another to minimize the air enclosed.

Figure 13:
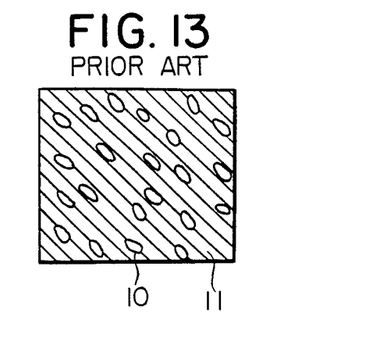
FIG. 13 is a sectional view of a conventional resin-molding tablet.

The tablet 11 thus formed, however, still has minute internal pores or spaces which communicate with similar pores or spaces in the outer region of the tablet through numerous minute pores, because the particles are merely compacted by mechanical compression force. These continuous pores, though they are very fine, are immediately refilled by air when the pusher piston 3 is moved to the left as viewed in FIG. 12 to force the formed tablet 11 outside the cylinder 1 from the left end opening of the cylinder 1. In consequence, numerous intergranular air pockets 10, i.e, pores filled with air, are formed in the final product of the tablet, as shown in FIG. 13.

Figure 14:
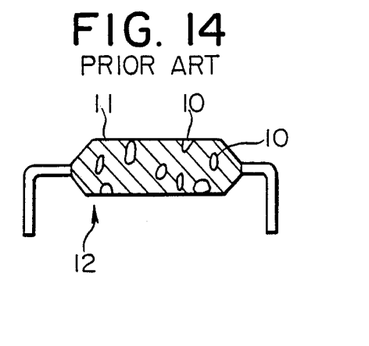
FIG. 14 is a sectional view of a conventional IC produced by the use of the tablet shown in FIG. 13.

When this tablet 1 is used for the purpose of packaging an IC chip as shown in FIG. 14 to form an IC product, the intergranular air 10 trapped in the tablet 11 is released into the spaces in the package to generate voids in the package, so that various inconveniences are caused such as deterioration of the performance of the IC 12 and degradation of the appearance of the IC product due to presence of voids on the package outer surface, resulting in a lower yield of the product.

SUMMARY OF THE INVENTION

Accordingly, an object of the present invention is to provide a resin-molding tablet for resin-molding semiconductor devices, which is improved in such a way as to prevent intergranular air from coming into contact with the semiconductor devices during resin-molding thereof, as well as a method of producing such an improved tablet.

Another object of the present invention is to provide a resin-molding method which enables, by the use of the improved tablet of the invention, semiconductor devices to be resin-molded so as to ensure a high yield of semiconductor packages.

To these ends, according to one aspect of the present invention, there is provided a resin tablet for resin-molding semiconductor devices, wherein a tablet of a resinous material is fused at at least the outer peripheral portion thereof such that the adjacent resin particles of the tablet are welded together to provide a fine and air-impervious structure thereby preventing atmospheric air from permeating into the tablet.

According to another aspect of the present invention, there is provided a method of producing a resin-molding tablet which comprises the steps of placing a resinous material in a vacuum vessel in which a predetermined level of vacuum is maintained to deaerate intergranular air in the resin material, and heating to a temperature below the softening point of the resin material and compressing the resinous material so that the resinous material is fused at at least the outer peripheral portion thereof to weld adjacent particles together.

According to still another aspect of the present invention, there is provided a resin-molding method in which the resin tablet of the invention is introduced into a vacuum mold in which a semiconductor device to be molded is placed.

In the resin-molding tablet of the present invention, adjacent resin particles of the tablet are fused to weld and integrate together at at least the outer peripheral portion of the tablet to form a fused surface layer of an extremely fine and air-impervious structure which surrounds the internal body of the tablet. This layer effectively prevents air from entering the tablet even when the tablet is placed in the atmosphere.

By feeding this tablet into a vacuum mold accommodating a semiconductor device, therefore, it is possible to sealingly resin-mold the semiconductor device without inclusion of any atmospheric air.

The fusion of the resin particles in the tablet is suitably effected by placing a resin material in a vacuum vessel to expel intergranular air, and then heating the resin particles to a temperature below the softening point of the resin particles and compressing the resin material.

These and other objects, features and advantages of the present invention will become clear from the following description of the preferred embodiments when the same is read in conjunction with the accompanying drawings.

DESCRIPTION OF THE PREFERRED EMBODIMENTS

Figure 1:
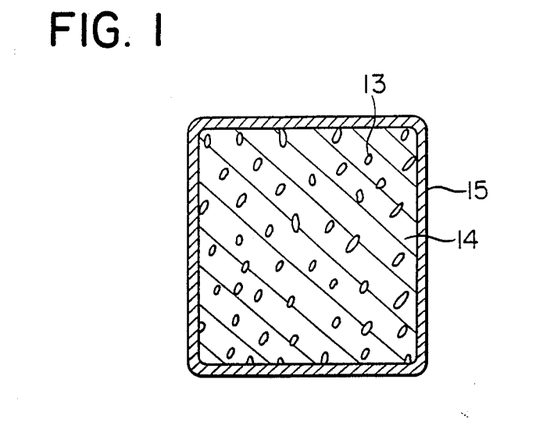
FIG. 1 is a sectional view of a resin-molding tablet for molding semiconductor devices provided in accordance with the present invention.

FIG. 1 is a sectional view of a first embodiment of a resin-molding tablet for resin-molded semiconductor devices in accordance with the present invention. The tablet has a tablet body 14 formed of resin particles which are densely compacted to leave fine intergranular pores which are maintained at a predetermined level of vacuum, and a shell 15 which is formed on the outer periphery of the tablet body 14 to encase the tablet body 14 for hermetically sealing the same from atmospheric air. The shell 15 is formed of resin particles which are the same as those in the tablet body 14 but are fused and welded together to form a substantially continuous dense or air-impervious layer having almost no pores therein.

Since the shell 15 provides a substantially continuous air-impervious surface layer, ambient air is prevented from coming inside the intergranular pores in the tablet body 14 so that the intergranular pores are maintained under vacuum even when the tablet is exposed to the ambient air.

Figure 2:
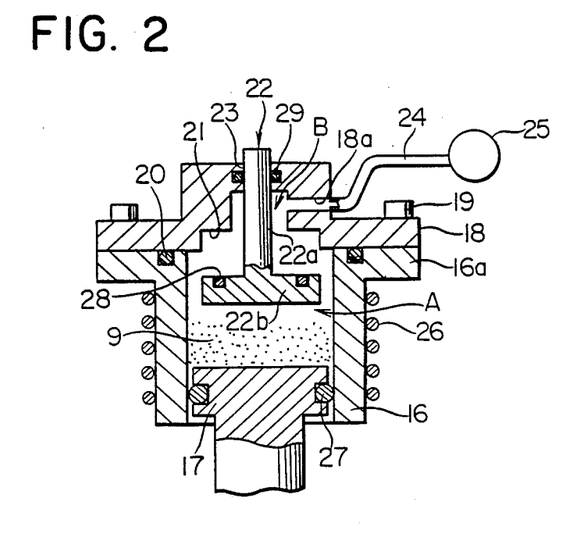
FIGS. 2 to 4 are illustrations of different steps of a method for producing a resin-molding tablet in accordance with an embodiment of the present invention.

FIG. 2 is a sectional view of a tablet forming machine suitable for use in the production of the tablet. The tablet forming machine has a cylinder 16 which is arranged substantially vertically and which has a cylinder chamber A of a substantially square cross-section each side of which is 37 mm long. The forming machine also has a piston 17 for sliding in the chamber A. A mounting flange 16a is formed on the upper end of the cylinder 16 integrally therewith. An upper cover 18 is detachably fastened by means of bolts 19 to the mounting flange 16a. An "O" ring 20 fits in an annular groove formed in the upper surface of the mounting flange 16a to provide a seal in the region between the upper cover 18 and the mounting flange 16a. A vacuum introduction chamber B facing the cylinder chamber A is defined in the upper cover 18 and an annular valve seat 21 is formed on the underside of the upper cover 18. A discharge valve 22 having a stem portion 22a and a valve portion 22b is installed such that the stem portion 22a can slide up and down in a central through-hole 23 formed in the upper cover 18 so that the valve portion 22b is moved into and out of sealing engagement with the valve seat 21 for selectively establishing and blocking fluid communication between the cylinder chamber A and the vacuum introduction chamber B.

A vacuum pump 25 is connected through a connecting pipe 24 to a discharge port 18a which is formed in the wall of the upper cover 18 in communication with the vacuum introduction chamber B. A heater 26 in the form of an electric resistance wire is provided on and around the outer wall surface of the cylinder 16 for heating the cylinder chamber A through the wall of the cylinder 16. An "O" ring 27 is received in an annular groove formed in the peripheral surface of the piston 17 to form a seal in the region between the inner peripheral surface of the cylinder 16 and the outer peripheral surface of the piston 17. The discharge valve 22 also has an "O" ring 28 received in an annular groove formed in the upper surface of the valve portion 22b to form a tight seal between the valve member 22b and the valve seat 21 formed in the upper cover 18 when the valve portion 22b is seated on the valve seat 21. An "O" ring 29 is received in a groove formed in the inner peripheral surface of the upper cover 18 defining the through-hole 23 for sealing between the outer peripheral surface of the stem portion 22a of the discharge valve 22 and the inner peripheral surface defining the through-hole 23.

Figure 3:
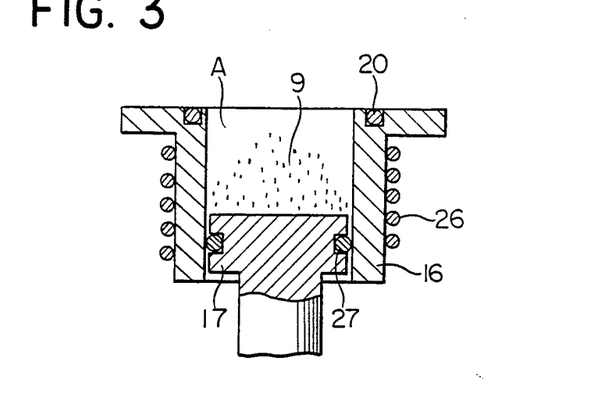

A description will be made hereinunder of a method of producing a resin-molding tablet by the tablet molding machine as explained in connection with FIGS. 2 through 4.

First, electric power is supplied to the heater 26 to heat the cylinder 16 of the forming machine up to, for example, 60° C. Then, by loosening the bolts 19, the upper cover 18 is demounted from the mounting flange 16a on the upper end of the cylinder 16, and the cylinder chamber A is charged with a powdered resin 9 as shown in FIG. 3. Thereafter, the upper cover 18 is secured and fastened again to the mounting flange 16a of the cylinder 16 by means of the bolts 19 to hermetically seal the vacuum introduction chamber B in the upper cover 18 and the cylinder chamber A in the cylinder 16 from the ambient air. The powdered resin is, although not exclusively, a mixture of particles of an epoxy resin and an inorganic filler having a mean particle size ranging between 0.1 and 2 mm. This powdered resin composition exhibits a softening point generally ranging between 80° and 100° C. Although the heating temperature of the cylinder is 60° C. in this embodiment, the heating temperature varies depending on the composition of the powdered resin.

Then, the piston 17 is moved downward to the lower end of the cylinder chamber A and the discharge valve 22 is pushed downward to move the valve portion 22b away from the valve seat 21. Subsequently, the vacuum pump 25 is started so that the air in the cylinder chamber A and the vacuum introduction chamber B is discharged through the discharge port 18a, whereby a reduced pressure of 0.5 Torr. or below is established within the chambers A and B in several seconds. Then, the discharge valve 22 is moved upward to bring the "O" ring 28 on the valve portion 22b of the discharge valve 22 into sealing contact with the valve seat 21 thereby to maintain the vacuum in the cylinder chamber A.

Figure 4:
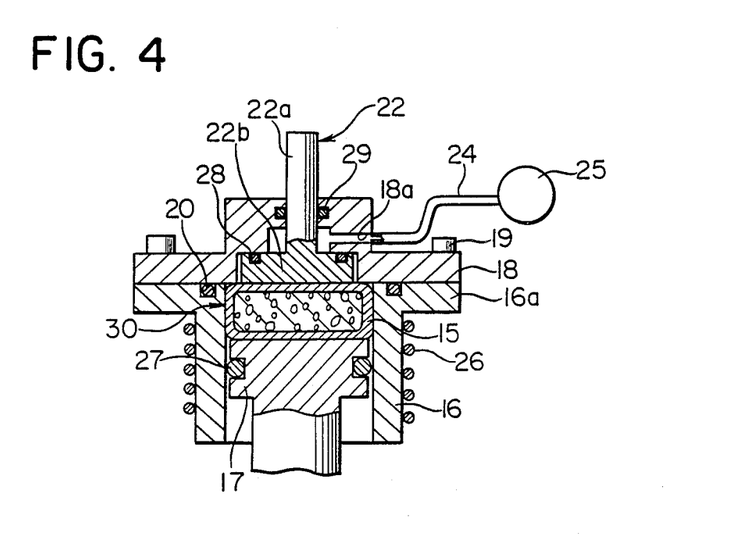

Subsequently, the piston 17 is moved forward or upward as shown in FIG. 4 to compress the powdered resin in the chamber A at a pressure of, for example, 1,000 kg/cm$^2$ through the cooperation between the discharge valve 22, the piston 17 and the cylinder 16. At the same time, the heater 26 is suitably controlled to maintain the cylinder 16 of the molding machine at about 60° C. In this state, the powdered resin is compacted and compressed so that the intergranular pores in the powdered resin 9 are collapsed and reduced to smaller sizes.

The compacting pressure is maintained for a predetermined period which may be, for example, 10 seconds or longer. Under the influence of such a high pressure and temperature, the particles of the powdered resin 9 in the peripheral region thereof contacting the cylinder 16, piston 17 and the discharge valve 22 are fused and welded together, whereby a resin-molding tablet 30 is obtained which has, as shown in FIG. 4, the shell 15 of a substantially continuous fine or integrated structure including few or no pores.

Subsequently, the upper cover 18 is demounted from the cylinder 16 and the piston 17 is advanced upward to force the molded tablet 30 out of the cylinder 16. It will be understood that the shell 15 of a substantially continuous fine or integrated structure, formed on the peripheral region of the tablet 30, effectively prevents the ambient air from coming into the interior of the tablet 30 when the tablet 30 is exposed to the ambient air.

In the illustrated embodiment, the powdered or pulverized resin 9 is charged into the cylinder chamber A while the powder is maintained at room temperature. This, however, is only illustrative and the powdered resin 9 may be charged into the cylinder 16 after the powdered resin 9 is heated a temperature near the melting temperature. The mean particle size of the powdered resin 9 also may be varied depending on conditions although it ranges between 0.1 and 2 mm in this embodiment.

It is also to be noted that, although in the above-described embodiment the heat and pressure are applied to fuse and weld the resin particles in the peripheral region of the tablet 30 to form the shell 15, the application of pressure and heat may be continued until the fusion and welding of the resin particles reach the core of the tablet 30.

Another embodiment of the tablet forming method in accordance with the present invention will be described hereinunder with reference to FIGS. 5 to 7.

This embodiment features the use of a pre-formed solid resin as the tablet material, in place of the powdered resin used in the preceding embodiment.

Figure 5:
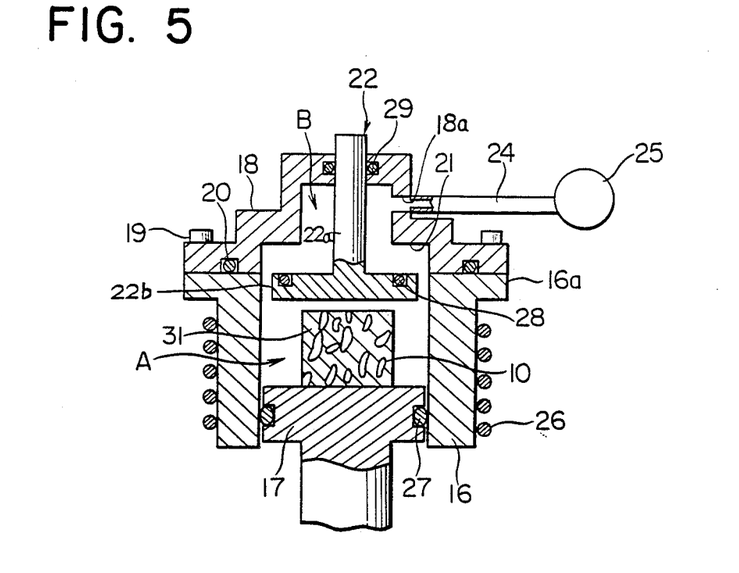
FIGS. 5 to 7 are illustrations of different steps of a method for producing a resin-molding tablet in accordance with another embodiment of the present invention.
Figure 6:
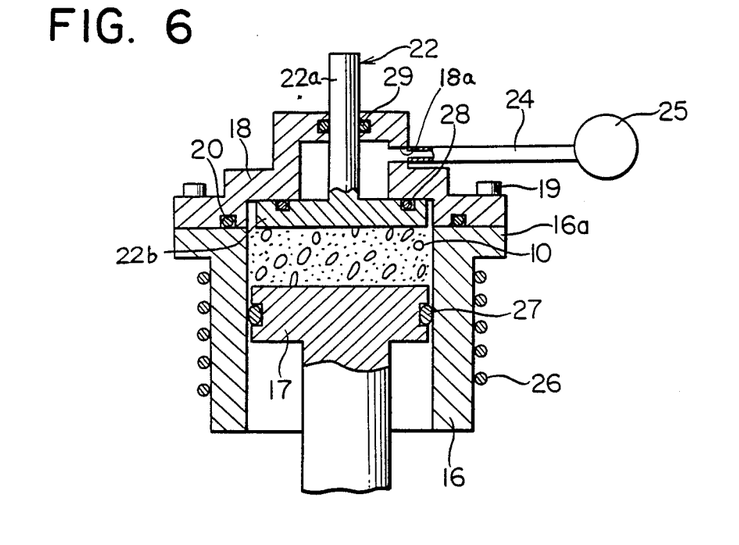
Figure 7:
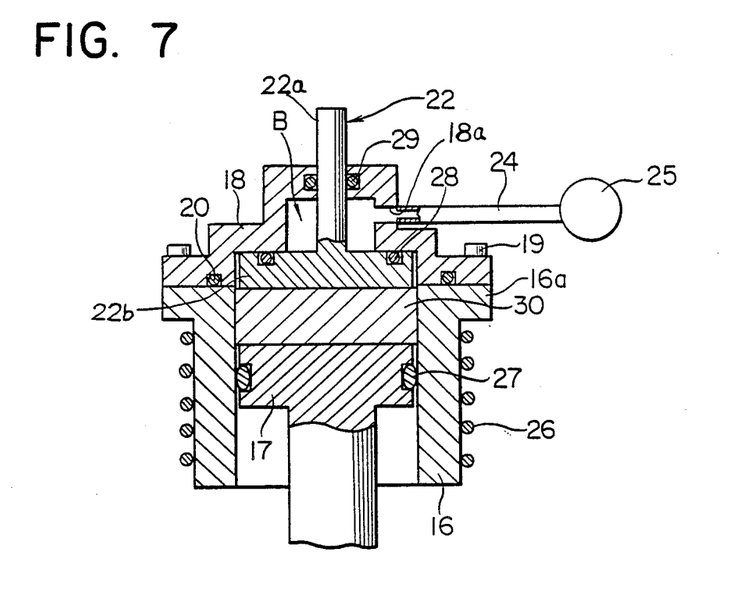

This method is suitably carried out by making use of a forming machine shown in FIGS. 5 to 7 which is materially the same as that shown in FIG. 2.

In operation, the forming machine is first heated up to 50° to 60° C. by the electric power supplied to the heater 26. The bolts 19 are then loosened to allow the upper cover 18 to be removed from the mounting flange 16a of the cylinder 16, and the pre-formed resin material 31 is placed in the cylinder chamber A. Then, the upper cover 18 is secured and fastened to the mounting flange cover 16a of the cylinder 16 by means of the bolts 19 to hermetically seal the vacuum introduction chamber B in the upper cover 18 and the cylinder chamber A in the cylinder 16 from the ambient air, as shown in FIG. 5. The pre-formed resin material 31 used in this embodiment is 28 mm in diameter, 35 mm in height and 35 g in weight, and has a softening or fusion temperature which ranges between 80° and 100° C. This pre-formed resin material 31 has internal intergranular pores which trap air. After re-adjusting the position of the lower stroke end of the piston 17 to prevent interference between the discharge valve 22 and the pre-formed resin member 31, the discharge valve 22 is moved downward to place its valve portion 22b away from the valve seat 21 to form a passage of a sufficiently large cross-sectional area between the valve portion 22b and the valve seat 21. As the vacuum pump 25 is started, the air in the cylinder chamber A and the vacuum introduction chamber B is discharged through the discharge port 18a, so that a reduced pressure of 0.5 Torr. or below is established in these chambers A and B in several seconds. Subsequently, the discharge valve 22 is moved upward to bring the "O" ring 28 in the valve portion 22 into sealing contact with the valve seat 21, thereby blocking communication between the cylinder chamber A and the vacuum introduction chamber B to maintain the vacuum in the cylinder chamber A.

In this state, the piston 17 is advanced upward to compress and crush the pre-formed resin material 31 under the vacuum, as shown in FIG. 6, by cooperation between the discharge valve 22, the piston 17, and the cylinder 16.

In this state, the intergranular air trapped by the pores between the particles of the pre-formed resin material 31 is released into the cylinder chamber A which is maintained at the reduced pressure. The release of the intergranular air into the cylinder chamber A inevitably lowers the level of the vacuum in the cylinder chamber A. The piston 17 is therefore retracted again and the valve portion 22b of the discharge valve 22 is moved apart from the valve seat 21 to enable the vacuum pump 25 to evacuate the cylinder chamber A.

Subsequently, the piston 17 is again moved upward to compress the crushed and pulverized resin material 31 against the discharge valve 22. In consequence, fusion and welding or integration of particles of the resin material 31 begins to take place in the peripheral region contacting the cylinder 16, the piston 17 and the discharge valve 22, due to the pressure and the heat applied by the piston 17 and the heater 26. As the pressure and the heat are maintained, the fusion and welding of the resin particles propagate to the core of the resin material 31 as shown in FIG. 7, whereby a parallelepiped resin-molding tablet 30 is obtained which has a square cross-section with 37 mm side length in conformity with the cross-section of the cylinder chamber A.

Then, the upper cover 18 is removed from the mounting flange 16a of the cylinder 16 and the piston 17 is moved upward to force the thus formed tablet 30 out of the cylinder 16.

In this embodiment, the pre-formed solid resin material 31 is deaerated by being crushed under vacuum to expel the intergranular air 10. This deaerating method, however, is not exclusive and the deaeration in advance of the final compression may be conducted by heating the resin material 31° up to 80° C. or higher to melt the same and by evacuating the interior of the forming machine.

It will also be understood that the fusion and welding of the resin particles may be effected only at the peripheral region of the tablet to form a shell similar to that in the preceding embodiment, rather than continuing the application of heat and pressure until the core of the tablet is fused.

A description will be made hereinunder as to a method embodying the present invention for molding a semiconductor device with the tablet 30 formed through the processes of the preceding embodiments.

Figure 8:
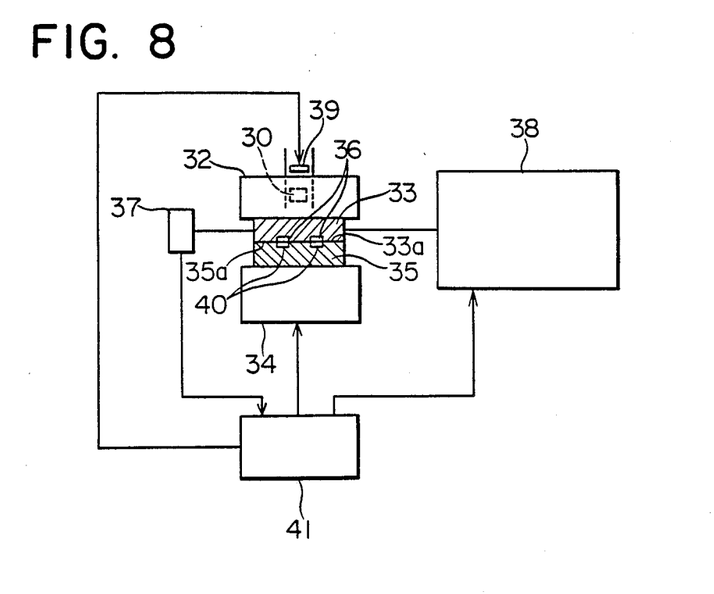
FIG. 8 is a block diagram of a resin-molding apparatus suitable for use in carrying out a resin-molding method in accordance with the invention.

FIG. 8 is a block diagram showing the construction of an apparatus which is suitable for use in carrying out the resin-molding method of the invention. The apparatus has a stationary die 33 secured to an upper platen 32 and a movable die 35 secured to a lower platen 34 opposing the stationary die 33. A plurality of cavities 36 each for forming an upper package (not shown) for resin-molding a semiconductor device are defined in the parting surface 33a of the stationary die 33. The stationary die 33 further has a transfer pot (not shown) in which a piston 39 is moved back and forth to selectively compress the tablet.

The movable die 35 is disposed under the stationary die 33 to be movable towards and away from the stationary die 33. A plurality of cavities 40 each for forming a lower package (not shown) for resin-molding the semiconductor device are defined in the parting surface 35a of the movable die 35.

A vacuum gauge 37 for measuring the level P of the vacuum established in the cavities 36 and 40 in dies 33 and 35 and a suction device 38 for evacuating the die cavity are connected to the stationary die 33.

The apparatus further has a controller 41 to which are connected the vacuum gauge 37, the suction device 38, an unillustrated actuator for the piston 39 and an unillustrated actuator for the lower platen 34. The controller 41 controls the timing of start of the stroking of the piston 39, and also controls the timing and rate of charging of the resin into the cavity 36, 40 in accordance with the vacuum level P in the die cavities detected by the vacuum gauge 37.

For the purpose of conducting resin-molding of the semiconductor device, the resin-molding apparatus having the described construction operates in a manner which will be explained hereinunder.

As the first step, a semiconductor chip (not shown) to be resin-molded is placed in one of the cavities 36 formed in the parting surface 35a of the movable die 35. Then, the movable die 35 is moved upward to bring its parting surface 35a into contact with the parting surface 33a of the stationary die 33, thus closing the dies 33 and 35. Subsequently, a piece of resin-sealing tablet 30 obtained through either one of the embodiments described before is set in the transfer pot of the stationary die 33.

Then, the tablet 30 is heated to melt by an unillustrated heater, and at the same time the suction device 38 is started under the control of the controller 41 so that the cavities 36, 40 in the dies 33, 35 are evacuated.

Figure 9:
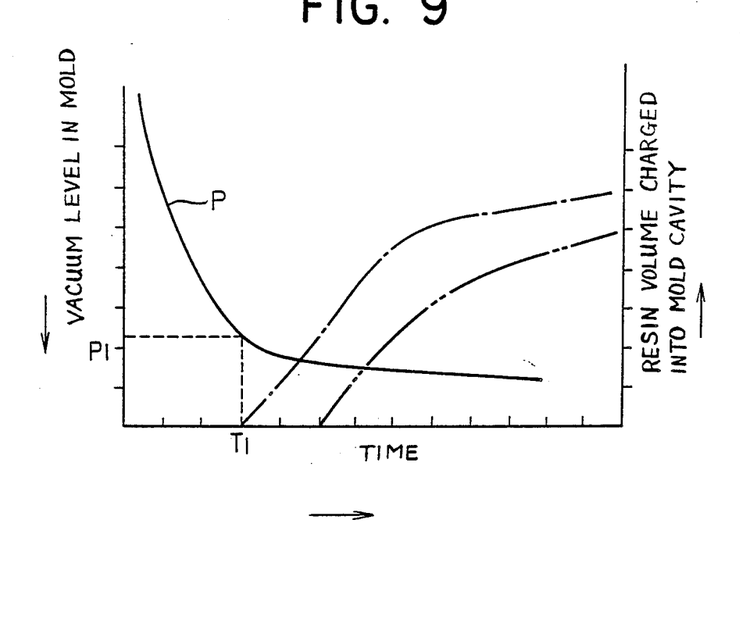
FIG. 9 is a graph showing the advantages brought about by the resin-molding method shown in FIG. 8.

In consequence, the level P of the vacuum thus established is monitored by the vacuum gauge 37 which delivers a signal indicative of the vacuum level P to the controller 41. The controller 41 in turn determines whether the detected vacuum level P has reached a predetermined vacuum level $P_1$. As shown in FIG. 9, the controller 41 starts to operate the piston 39 at a moment $T_1$ at which the vacuum level P in the die cavities 36, 40 exceeds the predetermined level $P_1$, thereby commencing charging of the tablet 30 into the die cavities 36, 40 as indicated by a broken line.

Thus, the molten tablet 30 is forcibly fed into the die cavities 36, 40 which are held under vacuum to envelop the unillustrated semiconductor device which was previously placed in the cavities. The molten tablet is then cooled and solidified so that the semiconductor device is sealingly encased by the tablet.

Figure 10:
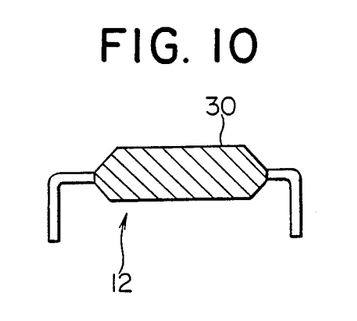
FIG. 10 is a sectional view of an IC produced by the resin-molding method explained in connection with FIG. 8.

It is therefore possible to obtain a semiconductor package 12 in which a semiconductor device such as an IC is sealingly molded by a tablet 30 containing little or no intergranular air. As a result, few or no voids are included in the semiconductor device and in the covering resin, as shown in FIG. 10.

It is to be understood that the conventional method does not employ any means for measuring the level of the vacuum in the die cavities. Namely, in general, a molding resin is charged into the die cavities after the interior of the dies has been evacuated to unnecessarily high vacuum levels as indicated by two-dot-and-dash line in FIG. 9. Thus, the level of the vacuum in the die cavities varies in respective molding cycles, resulting in lack of uniformity in the quality of the semiconductor packages as produced. In contrast, in the resin-molding method of the present invention, the timing of charging of the molten resin is precisely controlled in relation to the level of the vacuum in the die cavities, so that uniform quality of the produced IC packages is ensured. In addition, the time required for completing each resin-molding operation is shortened because the evacuation of the die cavities to unnecessarily high levels is eliminated in the resin-molding method of the present invention.

As will be understood from the foregoing description, the present invention offers the following advantages.

The resin-molding tablet in accordance with the present invention contains little or no intergranular air trapped therein, and invasion of air into the intergranular pores, which would otherwise be caused when the tablet is subjected to ambient air, is substantially eliminated due to the fact that at least the peripheral region of the tablet has been fused to allow the resin particles to weld and combine together to form a substantially continuous fine granular and air-impervious structure with almost no open pores.

By feeding this tablet into a vacuum die cavity holding a semiconductor device, therefore, it is possible to resin-mold the semiconductor device in an airtight manner without allowing any inclusion of voids in the semiconductor device and the molding resin. This in turn serves to not only improve the reliability of the molded semiconductor device appreciably but also eliminate degradation of appearance thereof attributable to the presence of voids. Consequently, semiconductor packages of uniform quality can be produced at a high yield.

What is claimed is:

1. A method of producing a resin tablet comprising:
placing a resin material having voids in a vacuum vessel and evacuating the vessel to remove air trapped in the voids of said resin material; and
heating the resin material to a temperature below the softening point of the resin material and applying pressure to said resin material to fuse at least a shell of said resin material and form a resin tablet substantially free of open pores.

2. A method of producing a resin tablet according to claim 1 wherein said resin material placed in the vacuum vessel is powdered or granular.

3. A method of producing a resin tablet according to claim 1 including applying heat and pressure simultaneously to the resin material in the vacuum vessel whereby the shell of resin material substantially free of open pores is formed.

4. A method for resin-molding a semiconductor device comprising:
placing particles of a resin in a vacuum vessel and evacuating the vessel to remove air trapped in voids between adjacent particles of said resin;
heating the resin particles to a temperature below the softening point of the resin particles and compressing said particles of said resin to fuse at least a shell of said resin and form a resin tablet substantially free of open pores; and
feeding said resin tablet into an evacuated die cavity in which a semiconductor device to be molded is disposed.

5. A resin-molding method according to claim 4 including feeding said resin tablet into said die cavity only after the die cavity is evacuated to at least a predetermined degree of vacuum.

6. A resin-molding method according to claim 5 including feeding said resin tablet by forcibly charging the tablet with a piston after the predetermined degree of vacuum in said die cavity is reached.

* * * * *

UNITED STATES PATENT AND TRADEMARK OFFICE
CERTIFICATE OF CORRECTION

PATENT NO. : 4,963,307
DATED : October 16, 1990
INVENTOR(S) : Sakai et al.

It is certified that error appears in the above-identified patent and that said Letters Patent is hereby corrected as shown below:

ON TITLE PAGE:   Please add;

--[30]   Foreign Application Priority Data

October 9, 1986 [JP]   Japan..................61-241678--

Signed and Sealed this

Twenty-eighth Day of April, 1992

Attest:

HARRY F. MANBECK, JR.

*Attesting Officer*       *Commissioner of Patents and Trademarks*